US 6,682,103 B1

(12) United States Patent  
Poirier

(10) Patent No.: US 6,682,103 B1
(45) Date of Patent: Jan. 27, 2004

(54) UNDERWATER CABLE PROTECTION PIPE

(75) Inventor: Nancy Poirier, Lorraine (CA)

(73) Assignee: IT International Telcom Holding Inc., Kirkland (CA)

( * ) Notice: Subject to any disclaimer, the term of this patent is extended or adjusted under 35 U.S.C. 154(b) by 0 days.

(21) Appl. No.: 09/868,763

(22) PCT Filed: Sep. 24, 1999

(86) PCT No.: PCT/CA99/00885

§ 371 (c)(1),
(2), (4) Date: Jun. 21, 2001

(87) PCT Pub. No.: WO01/24336

PCT Pub. Date: Apr. 5, 2001

(51) Int. Cl.[7] .............................. F16L 21/00
(52) U.S. Cl. .................. 285/146.1; 285/45; 285/261; 285/419
(58) Field of Search ............. 285/45, 261, 330, 285/419, 146.1

(56) References Cited

U.S. PATENT DOCUMENTS

| 875,301 A | * | 12/1907 | Wilkening | 285/330 |
| 1,054,904 A | * | 3/1913 | Carpenter | 285/330 |
| 1,105,844 A | * | 8/1914 | Schaperjahn | 285/330 |
| 1,822,624 A | | 9/1931 | Hoeftmann | |
| 1,849,423 A | * | 3/1932 | Everett | 285/330 |
| 2,052,958 A | * | 9/1936 | Webb | 285/330 |
| 3,643,986 A | * | 2/1972 | Allan | 285/330 |
| 4,615,543 A | * | 10/1986 | Cannon | 285/45 |
| 5,383,691 A | * | 1/1995 | Anthony | 285/330 |

FOREIGN PATENT DOCUMENTS

| DE | 36 06 420 | | 6/1992 | |
| EP | 0 194 228 | | 9/1986 | |
| FR | 2756114 | * | 5/1998 | 174/135 |

* cited by examiner

Primary Examiner—David Bochna
(74) Attorney, Agent, or Firm—Carter, Schnedler, & Monteith

(57) ABSTRACT

An underwater cable protection pipe (11) is comprised of two identical longitudinal half-pipe sections (13, 13') interconnectable with one another by integrally formed mating connectors (14). The half-pipe sections (13, 13'), when interconnected together, form a longitudinal hollow pipe (11) having a stub end (15) and an articulatable clamping ball end (16) shaped to clampingly receive the stub end (15) of a like pipe (11) to interconnect two or more of the pipes (11) end-to-end about a submerged cable (12).

4 Claims, 2 Drawing Sheets

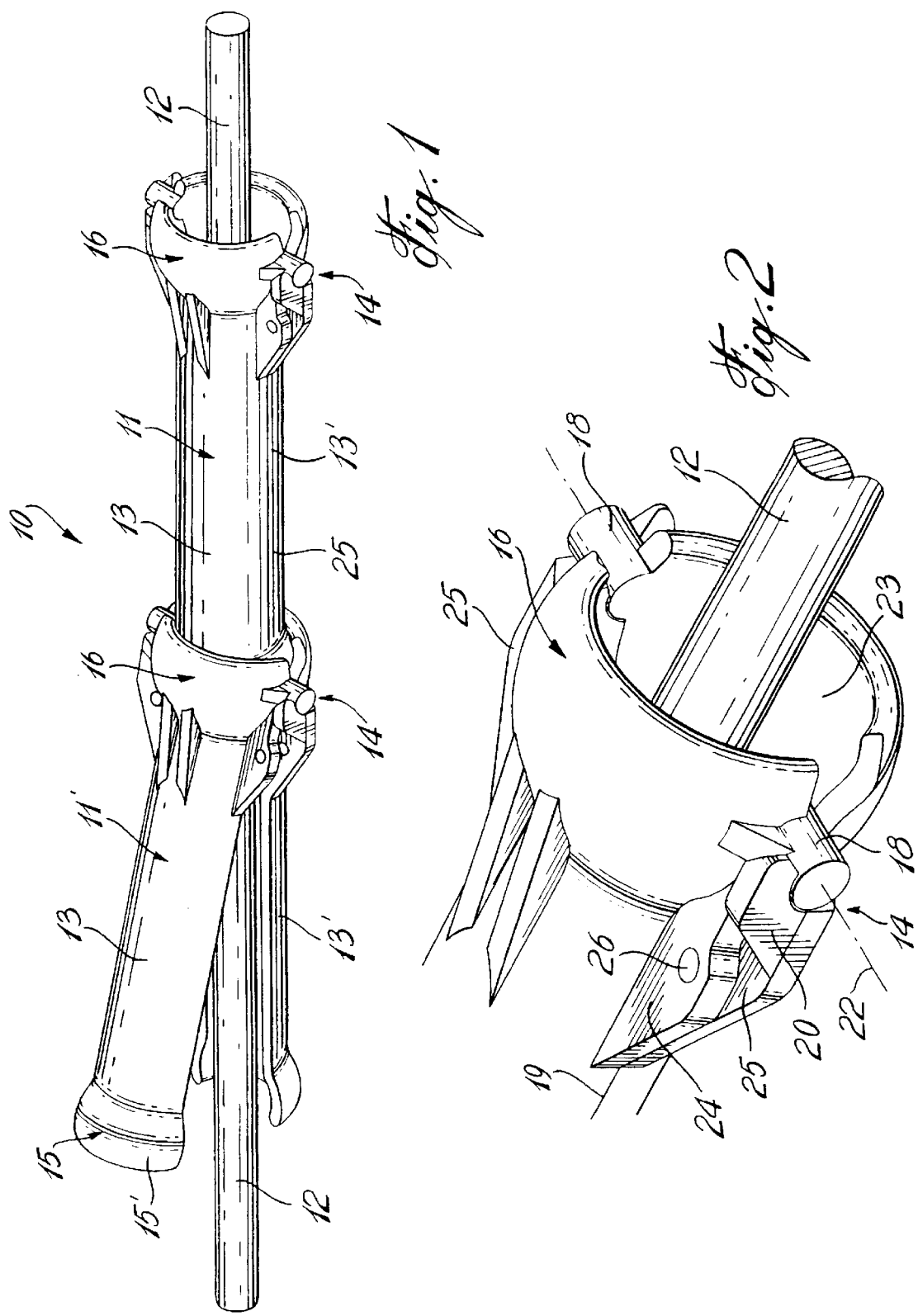

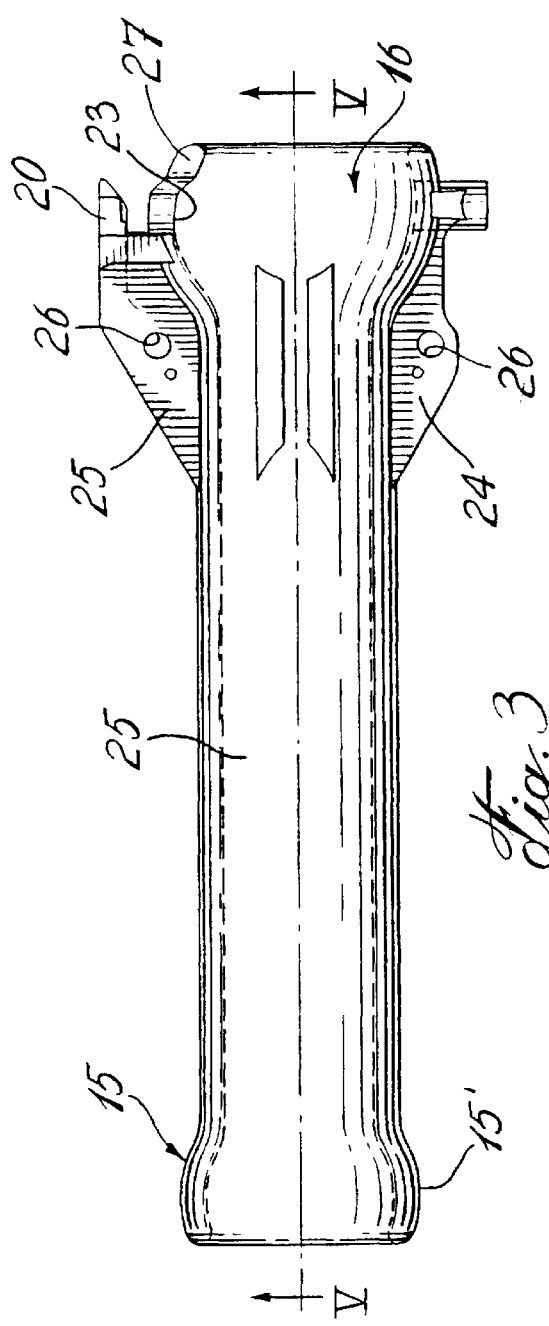
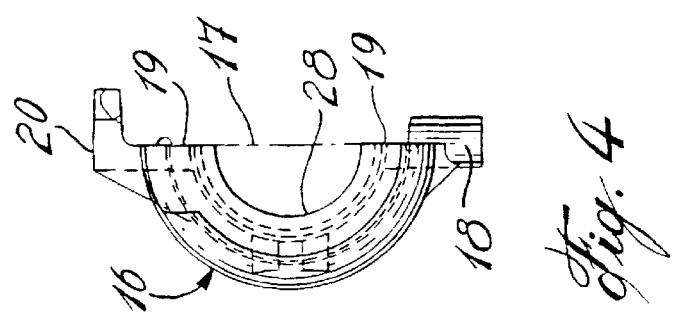
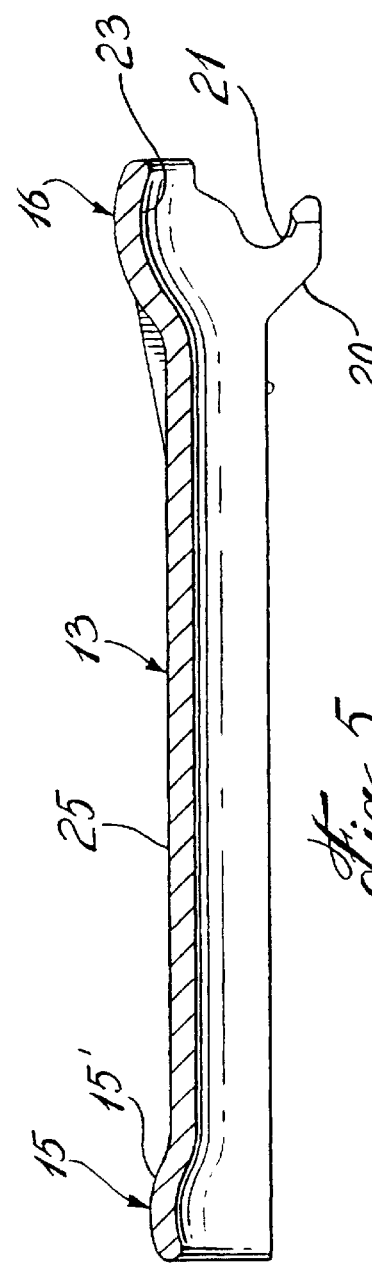

UNDERWATER CABLE PROTECTION PIPE

TECHNICAL FIELD

The present invention relates to an underwater cable protection pipe which is formed of two identical longitudinal half-pipe sections interconnected together by integrally formed mating connectors provided at a clamping ball end of the pipe sections and wherein the clamping ball end constitutes an articulated joint when pipes are interconnected together end-to-end.

BACKGROUND ART

Articulated pipes are used to protect submarine is cables when burial of submarine cables is not feasible due to hard sea bottom or when burial creates environmental concern since it disturbs the seabed sediments. Existing articulated pipes are made of short sections of pipe split in two longitudinal halves. Each section has one small ball type end and one large ball type end. The large ball type end encloses over the small ball end of the previous section holds it captive. This locks the end of the previous section and provides an articulated joint that can adjust itself to the seabed profile.

There are two types of existing articulated pipes. The section of the first pipe is made of two identical halves that need to be bolted together. This means a very long and fastidious task for the divers installing team. The second type solves the problem of the bolts by using self-locking parts. This system comprises two different cast segments which are identified as uppers and lowers. The upper part hooks fitting on the stubs of the lower part. Having two different parts bring other problems, such as, shipment miscount (different number of lowers and uppers at one site) and need for two different molds for a more expensive fabrication process. All the existing articulated pipes are also made of ductile iron.

DISCLOSURE OF INVENTION

It is a feature of the present invention to provide an underwater cable protection pipe which overcomes all of the above-mentioned disadvantages of existing articulated pipes.

Another feature of the present invention is to provide an underwater cable protection pipe which is formed of two identical longitudinal half-pipe sections and which are cast with integrally formed connectors whereby the pipe halves are connected together without the use of bolts or other type fasteners which have to be installed under water.

Another feature of the present invention is to provide an underwater cable protection pipe which is easier, and faster to install and cheaper to produce and wherein the pipe is made of anodized aluminum thereby resulting in a significant reduction in weight as compared to existing ductile iron pipes.

According to the above features, from a broad aspect, the present invention provides an underwater cable protection pipe which comprises two identical longitudinal half-pipe sections which are interconnectable with one another by integrally formed interlocking mating connectors. The half-pipe sections when interconnected together in juxtaposition form a longitudinal hollow pipe having a stub end and an articulatable clamping ball end shaped to clampingly receive the stub end of a like pipe to interconnect two or more of the pipes end-to-end about a submerged cable.

BRIEF DESCRIPTION OF THE DRAWINGS

A preferred embodiment of the present invention will now be described with reference to the accompanying drawings in which:

FIG. 1 is a perspective view showing two underwater cable protection pipes constructed in accordance with the present invention and secured about an underwater cable;

FIG. 2 is an enlarged perspective view showing the construction of the clamping ball end of the pipe and its integrally formed interlocking connectors;

FIG. 3 is an elevation view showing the shape and construction of a half-pipe section;

FIG. 4 is an end view of FIG. 3; and

FIG. 5 is a section view along section lines V—V of FIG. 3.

MODES FOR CARRYING OUT THE INVENTION

Referring now to the drawings and more particularly to FIG. 1, there is shown generally at 10 two underwater cable protection pipes 11 and 11' which are interconnected end-to-end about an underwater cable 12 to protect the cable. The underwater cable protection pipe 11 is comprised of two identical longitudinal half-pipe sections 13 and 13' which are interconnected together by integrally formed interlocking mating connectors, generally indicated at 14, and which will be described in detail later. As hereinshown when these pipe sections 13 and 13' are interconnected together they form the longitudinal hollow pipe 11.

Each of the half-pipe sections 13 and 13' are cast from anodized aluminum which is much lighter than ductile iron pipes which have heretofore been utilized for underwater protection pipes. The half pipe sections 13, 13' are cast with a stub end 15 and an articulatable clamping ball end 16.

With further reference now to FIGS. 2 to 5, it can be seen that the interlocking connectors 14 are integrally formed on opposed sides of the clamping ball end 16 of the half-pipe sections 13, 13'. The connectors 14 are disposed on a diametrical axis 17 (see FIG. 4) of the clamping ball end 16 and permit the half-pipe sections to interconnect and pivot to effectuate the interconnection.

As shown, the connectors 14 are constituted by a transverse pin 18 which, as better seen from FIGS. 2 and 4, which projects laterally adjacent a top end edge 19 of the ball end 16 of the half-pipe sections 13. A hook connector 20 projects on an opposed side of the ball end 16 and has an arcuate jaw formation 21 which is disposed in axial alignment with the longitudinal central axis 22 of the transverse pin 18. The center of the arc or radius of the arcuate jaw formation 21 lies on the longitudinal central axis 22 of the pin whereby the transverse pin 18 may be received in friction fit within the arcuate jaw formation 21 to provide pivoting of the interconnected half-pipe sections 13 and 13', as shown in FIG. 1. Because the half-pipe sections are inverted, the jaw formations 21 of a top half-pipe section lies above the pin of a bottom half-pipe section, and the jaw formation on the bottom half-pipe section which is on the other side projects under the pin of the top half-pipe sections. Accordingly, as shown in FIG. 2, the half-pipe sections 13 and 13' interlock but can still pivot as shown in FIG. 1 to permit interconnection and interlocking of a series of pipes 11 together.

Accordingly, it can be seen that with one standard half-pipe section, when these are interconnected in juxtaposition, and pipes 11 interconnected end-to-end, they can provide protection along any given cable length without the use of fasteners except for the last assembled pipe which looks all the pipes together.

The stub end 15 of the half-pipe section is constituted by an enlarged curved side wall end section 15' whereby when two halve-pipe sections are interconnected in juxtaposition, it forms the small ball end 15. This small ball end 15 has an outer diametrical surface which is dimensioned to fit within the inner diametrical surface 23 (see FIGS. 3 and 5) of the clamping ball end 16 whereby to interconnect pipes end-to-end and to permit limited articulation thereof. The clamping ball end 16 defines an outer clamp ledge 27 which forms a semi-circular opening 28. When both half-pipe sections 13 and 13' are interconnected in juxtaposition, the ball end of the assembled pipe 11 defines a restricted circular opening to clamp about the side wall 13 of the pipe and retain the small ball end section 15 captive within the enlarged inner end of the ball end 16 while still permitting articulation.

As better seen in FIGS. 2 and 3, the clamping ball end 16 is also provided with a pair of horizontal flanges 24 and 25 which terminate flush with the surface of the top end 19 of the half-pipe sections, as better seen from FIG. 4. They are located behind the ball section of the clamping ball end 16 and project outwardly of the outer side wall 25 of the half-pipe sections. A transverse hole 26 is provided in each of these flanges at a predetermined location whereby when the half-pipe sections 13 and 13' are matingly interconnected together, these holes 26, in juxtaposed flanges 24 and 25, will align together. The purpose of these holes is to permit a last one of a series of protection pipes 11 to be locked by a bolt fastener thereby securing or interlocking the series of pipes while permitting articulation therebetween. Accordingly, it can be appreciated that many pipe sections can be easily assembled under water and connected end-to-end in a manner which is easy and very fast as compared to prior art pipe installations.

The connector to lock the last pipe section may be a quick lock type connector which requires very little time to install. When the last pipe section is locked, then automatically the entire series of the pipes are locked without having to secure fasteners about each pipe section, as is the case with the prior art. Also, because the pipes are formed of identical half-pipe sections, a single mold is required to produce these pipe sections and it greatly facilitates installation and inventory control. The installer is not required to inspect pipe halves to identify the bottom or top half-pipe section because these are identical and therefore this greatly facilitates the installation.

It is within the scope of the present invention to cover any obvious modifications of the embodiment described herein, provided such modifications fall within the scope of the appended claims.

What is claimed is:

1. An underwater cable protection pipe comprising two identical longitudinal half-pipe sections interconnectable with one another by integrally formed interlocking mating connectors, said half-pipe sections when interconnected together in juxtaposition forming a longitudinal hollow pipe having a stub end and an articulatable clamping ball end shaped to clampingly receive said stub end of a like pipe to interconnect two or more of said pipes end-to-end about a submerged cable, and wherein connectors are integrally formed on opposed sides of said clamping ball end and when interconnected are disposed on a diametrical axis of said ball end permitting said half-pipe sections to pivot on said connectors, said connectors being constituted by a transverse pin projecting laterally adjacent a top end edge of said ball end of said half-pipe section and a hook connector projecting on an opposed side of said ball end, said hook connector having an arcuate jaw formation disposed in axial alignment with the longitudinal central axis of said transverse pin for receiving in friction fit a portion of said transverse pin of a mating half-pipe section and on opposed sides of said clamping ball end whereby to interconnect and align two of said half-pipe sections together.

2. An underwater cable protection pipe as claimed in claim 1 wherein said stub end is formed with an enlarged curved side wall end section to form a small ball end when two of said half-pipe sections are interconnected in juxtaposition, said small ball end having an outer diametrical surface which is dimensioned to fit within the inner diametrical surface of said clamping ball end to permit articulation of two interconnected pipes.

3. An underwater cable protection pipe as claimed in claim 1 wherein said half-pipe sections are cast of anodized aluminum having a weight which is substantially half of ductile iron.

4. An underwater cable protection pipe as claimed in claim 1 wherein there is further provided a pair of flanges formed behind said clamping ball end and projecting outwardly of an outer side wall of said half-pipe sections, a transverse hole formed in said flanges, said half-pipe sections when matingly interconnected together causing said flange holes to align, said aligned holes providing for a fastener to interlock a last one of a series of said protection pipes interconnected end-to-end thereby interlocking all of said pipes while permitting articulation of said pipes.

* * * * *